Patented Sept. 1, 1942

2,294,383

UNITED STATES PATENT OFFICE 2,294,383

PROCESS FOR THE PREPARATION OF ETHYLENE OXIDE

Ray M. Carter, Glenbrook, Conn., assignor to U. S. Industrial Alcohol Co., New York, N. Y., a corporation of West Virginia No Drawing. Application August 3, 1940,
Serial No. 351,245

1 Claim. (Cl. 260—348)

This invention relates to processes for the catalytic oxidation of ethylene for the production of ethylene oxide.

The catalysts used in the process of the present invention consist essentially of tabular corundum as a carrier or support impregnated and coated with a silver oxidation catalyst.

Tabular corundum is a product manufactured and sold by the Aluminum Company of America under the name "Tabular Corundum" and the trade name "Bauxite Ore Concentrates." It has been described in the Weiss Patent No. 2,209,908 as follows:

"'Tabular Corundum' is a crystalline aluminum refractory material having readily bonded surfaces and consisting essentially of interlocked corundum crystals in tabular form, having the contained impurities disseminated in minute globules throughout the crystalline alumina, and being substantially free from intercrystalline glass, so that the refractory particles possess the properties of corundum rather than those of the glass or matrix of impurities. Impurities are present in 'Tabular Corundum' only in very small quantitites. Thus, the sodium content may be as low as 0.001% by weight, calculated as sodium oxide.

"'Tabular Corundum' is a commercial product manufactured by mixing aluminum oxide with one or more of several compounds, and heating the mixture to a temperature within the range of about 800° C. to about 1800° C., but not to the melting point of aluminum oxide. The compound or compounds included with the aluminum oxide induces a recrystallization of the aluminum oxide to the alpha-corundum form. This recrystallization brings about a knitting of the entire mass into a bonded material. The compounds added for the purpose of inducing recrystallization are, for example, sodium oxide and chromic oxide and are sublimed out of the aluminum oxide during the heating process, leaving the aluminum oxide in the form of alpha-corundum and in a state of high purity. Spectrographic analyses of 'Tabular Corundum' have shown very minute quantities of calcium and very low percentages of sodium to be essentially the only impurities present. However, such analyses have shown in addition to the sodium and calcium a large number of elements whose spectral lines are extremely faint and indeed only recognizable by most careful technique and manipulation in photographing the spectrum. The elements where such faint spectral lines were detected were iron, silicon, titanium, zirconium, vanadium, copper, manganese, lead, tin, silver, barium, strontium, gallium, magnesium, chromium and potassium.

"'Tabular Corundum' is a distinctly different material from 'Refractory Alundum.' The aluminum oxide in 'Tabular Corundum' has not been fused while that of 'Refractory Alundum' has been. 'Tabular Corundum' is almost entirely aluminum oxide and has the properties of the alpha-corundum crystalline form of aluminum oxide, while 'Refractory Alundum' contains a high percentage of aluminum silicate and partakes of the properties of the aluminum silicate."

Tabular corundum is a commercial product of a highly refractory character made up of crystalline alumina and is of a porous character and adapted for use to advantage as a support or carrier for silver oxidation catalysts for the catalytic oxidation of ethylene to ethylene oxide. Its crystalline structure is that of alpha corundum with interlocking tabular crystals which are substantially free from inter-crystalline glass. Tabular corundum has a desirable rigid structure and when refractory corundum bricks are crushed and sized to particles of suitable size for use as a catalyst support the catalysts made therefrom have a sufficient strength so that they resist crumbling of packing even where catalyst masses of substantial depth are used. Particles of different sizes can be used, for example, fragments of around $\frac{3}{8}$ inch to $\frac{1}{2}$ inch size.

Tabular corundum has a desirable porosity such that the fragments thereof used as the catalyst support are readily impregnated and coated with the silver catalyst.

The catalysts or contact masses may be made with varying amounts of silver oxidation catalysts supported on the tabular corundum carrier.

The invention will be more particularly illustrated by the following example but the invention is not limited thereto.

A carrier consisting essentially of tabular corundum, broken and sized into fragments of suitable dimensions, for example, roughly $\frac{3}{8}$ inch to $\frac{1}{2}$ inch, is thoroughly soaked in a water solution of silver nitrate of sufficient strength to provide the desired amount of silver on the finished catalyst, for example, $2\frac{1}{2}$ to 10% of silver. The resulting mass is evaporated to dryness and the silver nitrate is then subjected to reduction with hydrogen at a suitable temperature, e. g., around 300° C. A catalyst is thus produced in which the tabular corundum support or carrier is impregnated and coated with catalytic silver and such a catalyst is particularly advantageous for use in the partial catalytic oxidation of ethylene, to produce ethylene oxide, for example, in accordance with the process of my prior Patents Nos. 2,125,333 and 2,177,361.

In the above example the percentage of silver on the carrier can be varied, e. g., from around 2½% or less up to 10 or 20% or even more. The temperature of reduction of the silver nitrate with hydrogen can also be varied and other reducible silver compounds than the nitrate can be used.

Such catalysts made with tabular corundum as a carrier have been found well adapted for use in the catalytic oxidation of ethylene to produce ethylene oxide and retain a highly catalytic activity over long periods of time.

I claim:

The method of producing ethylene oxide which comprises subjecting a gaseous mixture including ethylene and oxygen to contact with a contact mass including a rigid crystalline alumina refractory, consisting essentially of interlocked corundum crystals in tabular form substantially free of inter-crystalline glass, impregnated and coated with a silver catalyst.

RAY M. CARTER.